United States Patent

[11] 3,581,921

| [72] | Inventors | Mathew G. Boissevain<br>Los Altos Hills;<br>Robert J. Traube, San Mateo, both of, Calif. |
|---|---|---|
| [21] | Appl. No. | 867,431 |
| [22] | Filed | Oct. 16, 1969 |
| [45] | Patented | June 1, 1971 |
| [73] | Assignee | FMC Corporation<br>San Jose, Calif.<br>Continuation of application Ser. No. 810,423, Jan. 2, 1969, now abandoned, which is a division of application Ser. No. 697,381, Jan. 21, 1968, now Patent No. 3,458,062. |

[54] METHOD OF PROCESSING ARTICLES ON AN ENDLESS CONVEYOR IN A WAREHOUSE
2 Claims, 17 Drawing Figs.

[52] U.S. Cl. .................................................. 214/152
[51] Int. Cl. .................................................. B65g 1/06
[50] Field of Search .......................................... 214/152, 16.4, 16.42, 16.12; 186/1

[56] References Cited
UNITED STATES PATENTS

| 1,819,491 | 8/1931 | White et al. .................. | 186/1 |
| 1,843,280 | 2/1932 | Hall ............................ | 186/1 |
| 2,242,811 | 5/1941 | Bowers ......................... | 186/1 |
| 3,343,692 | 9/1967 | Arnot ........................... | 214/16.4(2) |
| 3,442,403 | 5/1969 | Weir ............................ | 214/16.4(2) |

Primary Examiner—Gerald M. Forlenza
Assistant Examiner—Raymond B. Johnson
Attorneys—F. W. Anderson and C. E. Tripp ABSTRACT: Articles to be picked for filling orders from retail outlets are stored in the warehouse on pallets, and each pallet is disposed on a tray. Each pallet contains articles of one particular category, such as a particular size and brand of soap, and the trays are disposed on an endless carrier in a predetermined order. The endless carrier is moved in a generally vertical plane so that each pallet of articles is presented to the order-filler in the predetermined order. Apparatus is provided for replenishing pallets that have been emptied while keeping them in the desired order. A tape that has labels arranged in a sequence indicating the category and the number of articles to be picked, is prepared in advance by one who knows the sequence of the trays in the endless carrier and the number of items to be picked of each category and can therefore prepare the tape so that the trays may be processed in said predetermined order. Accordingly, following the method of the present invention, the order-picker is able to receive his instructions from the tape, index the necessary tray to the order-picking station and pick the desired number of articles therefrom.

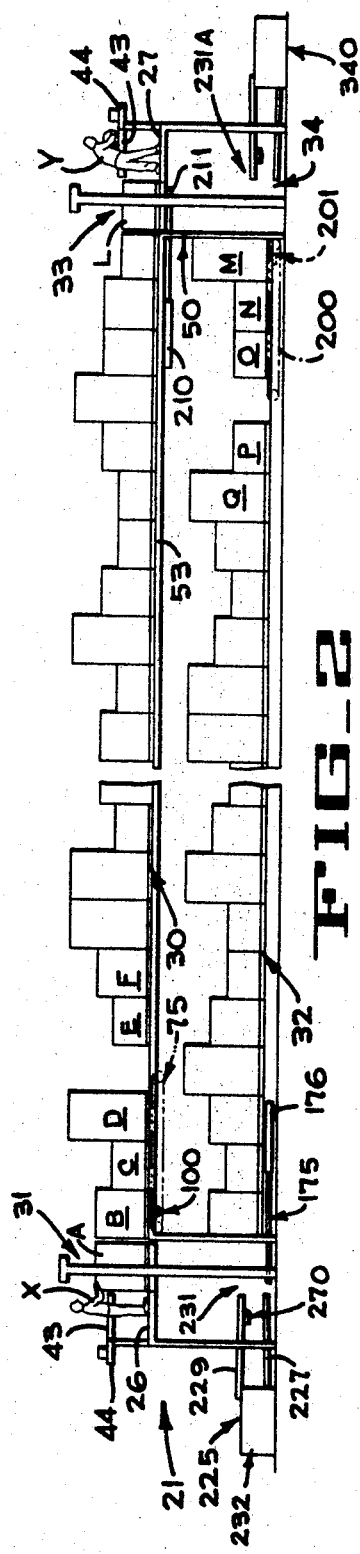
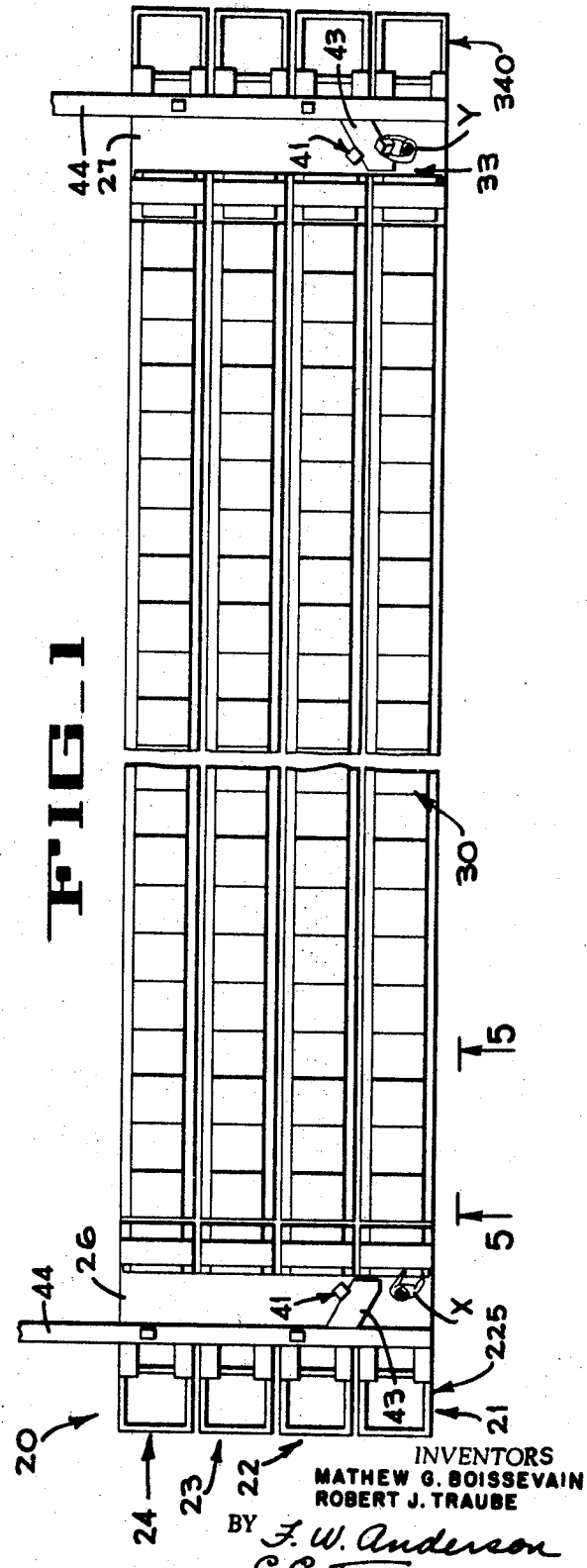

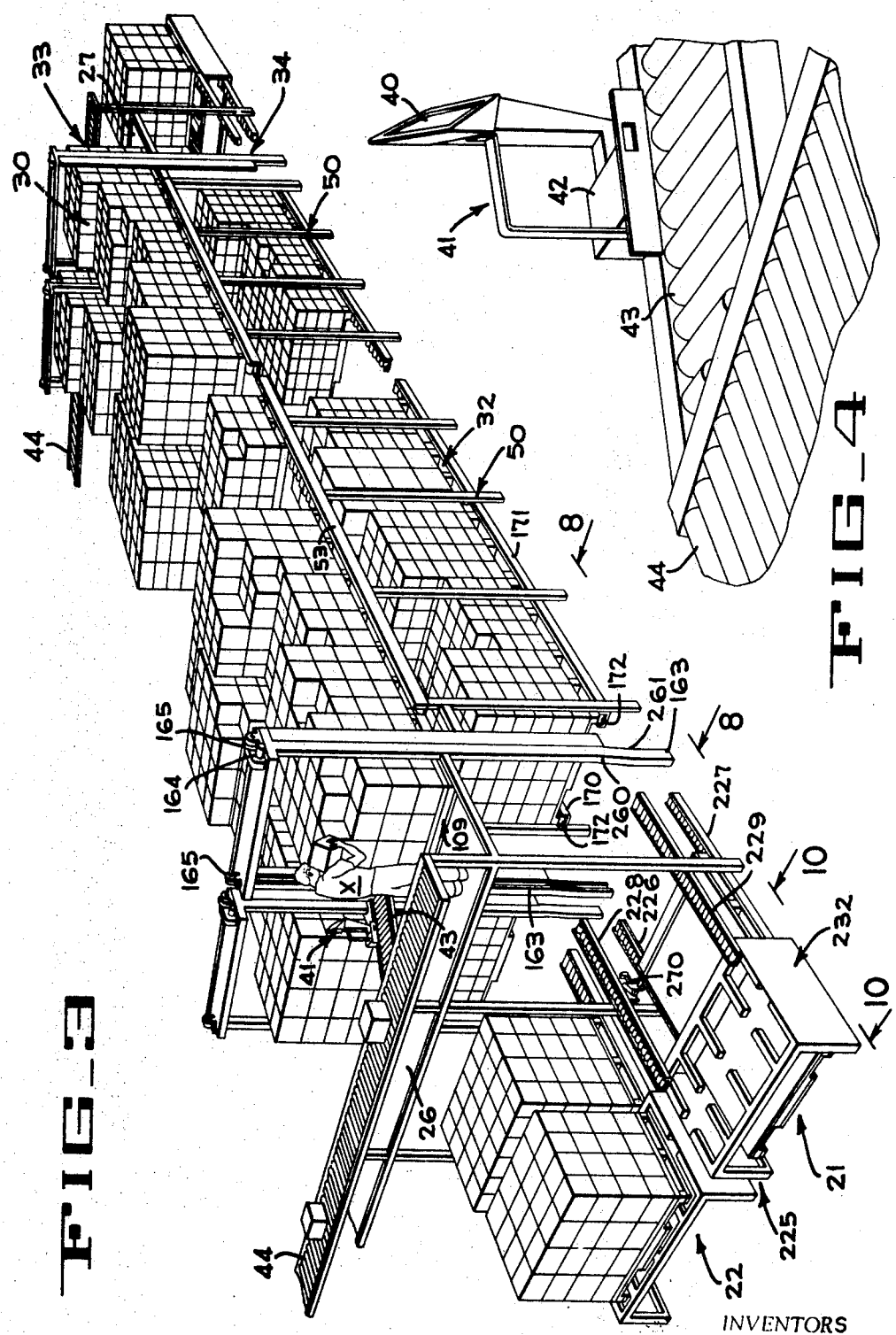

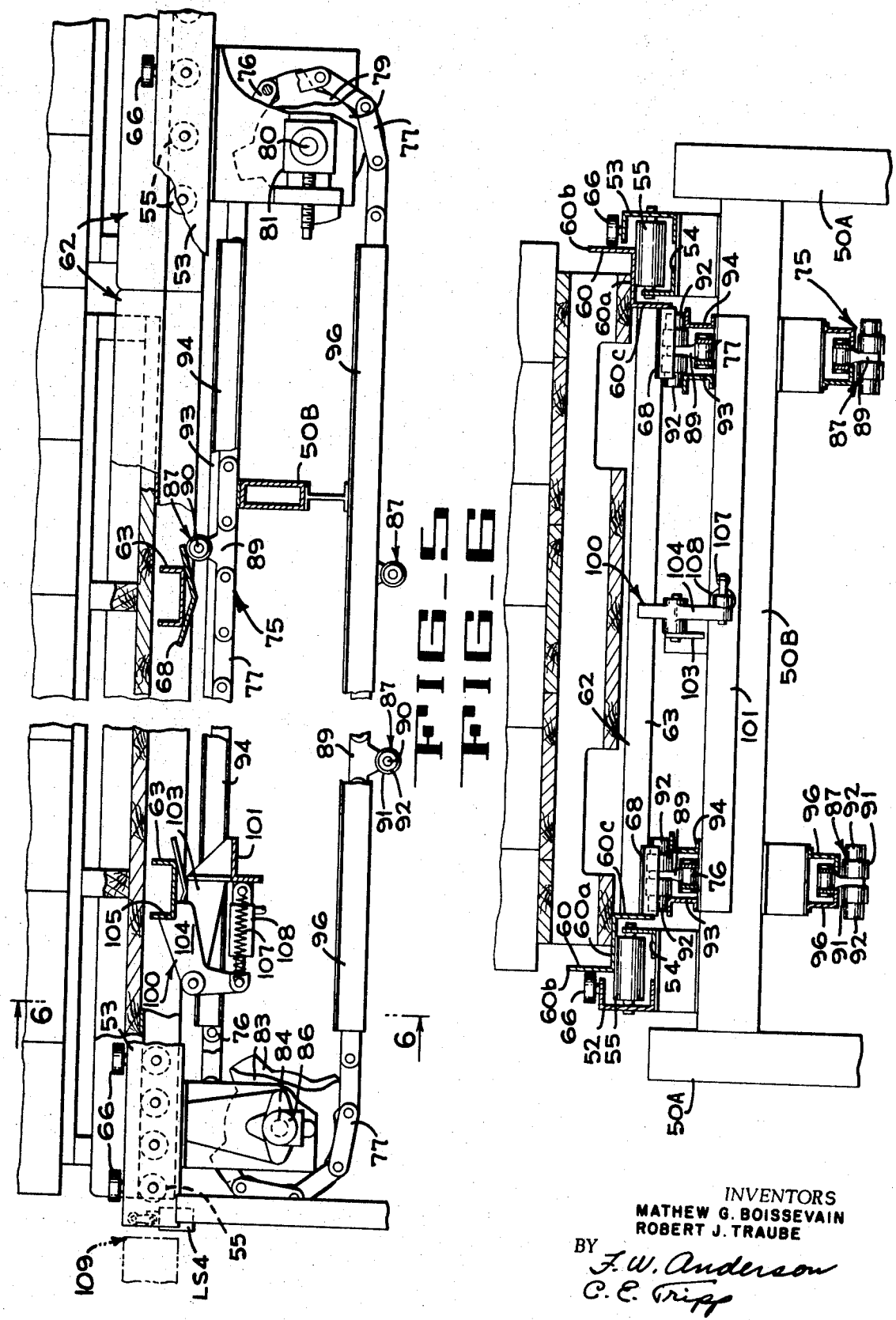

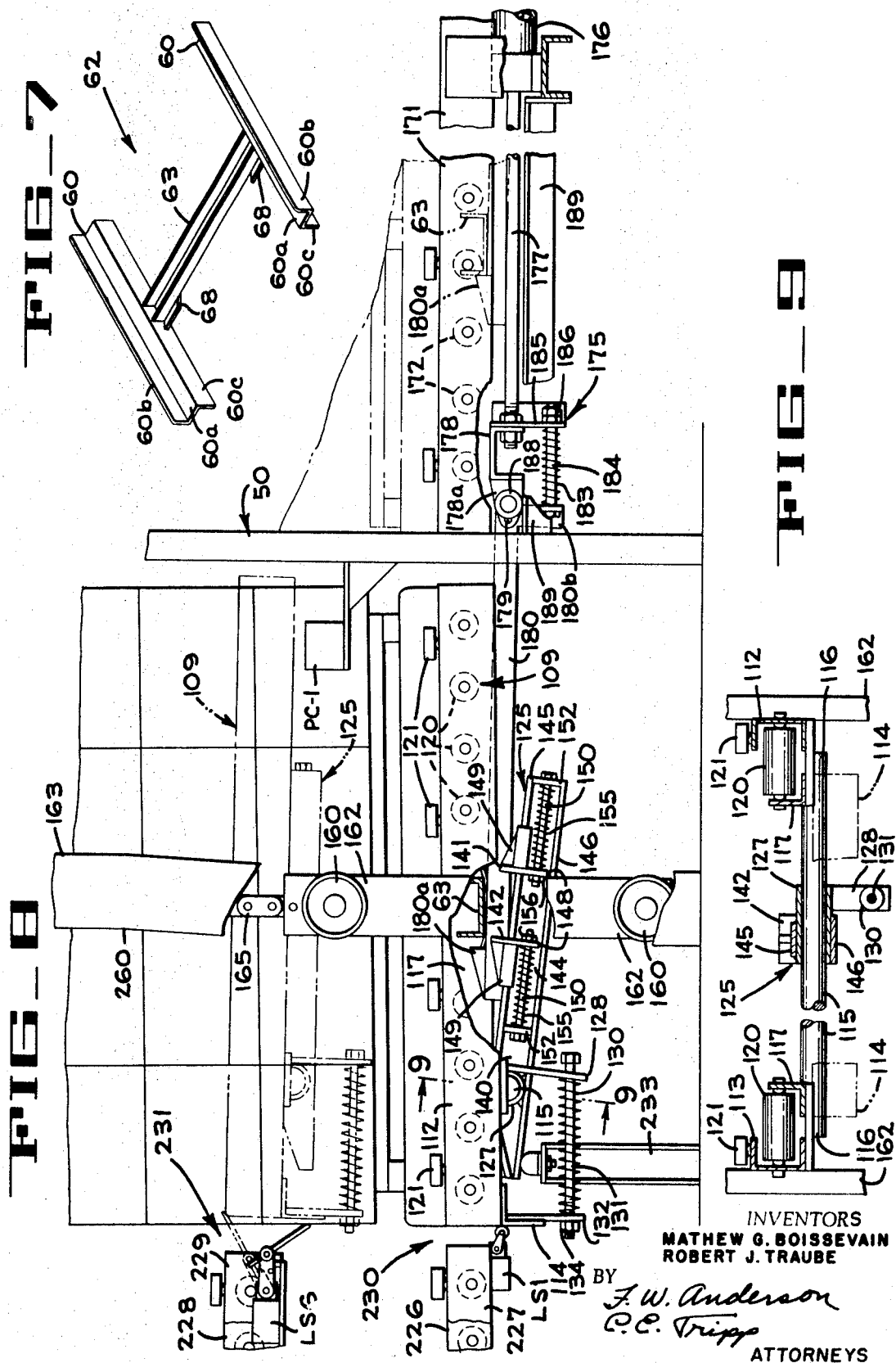

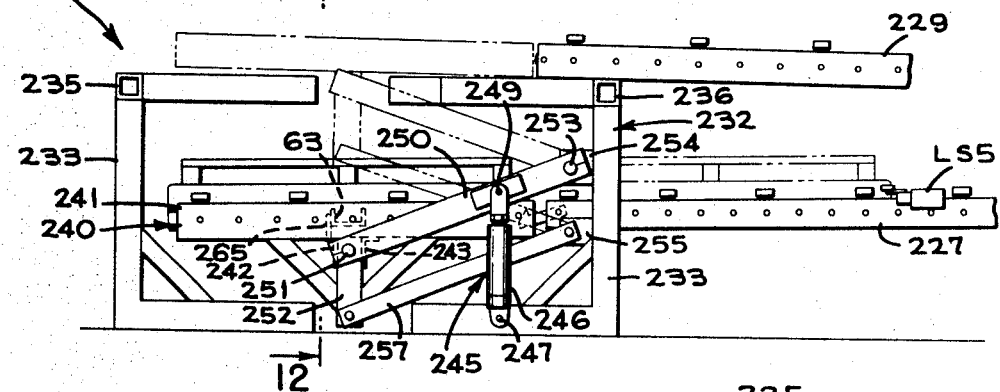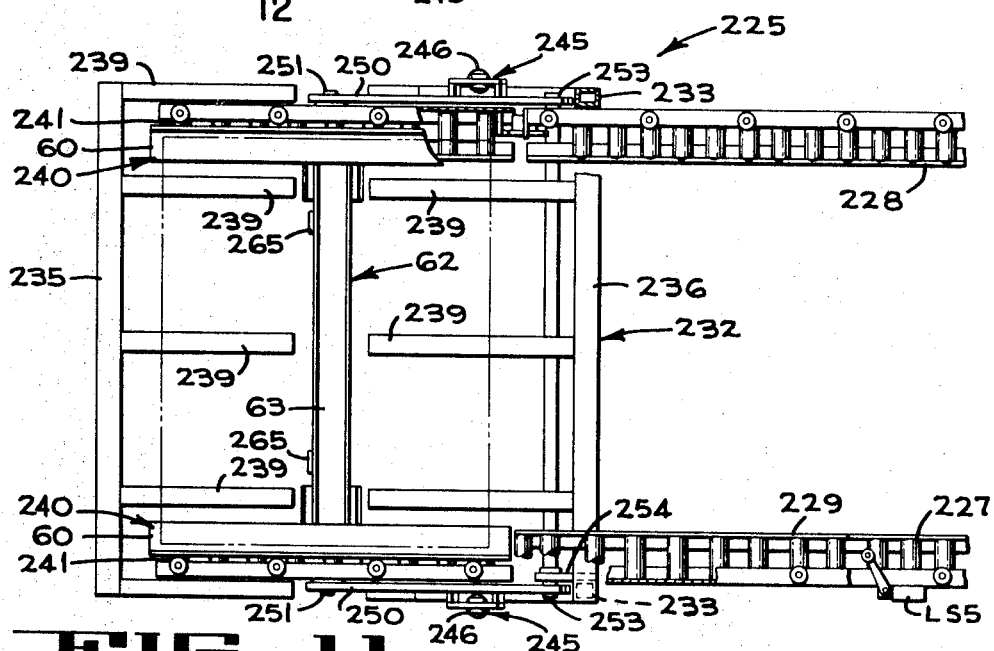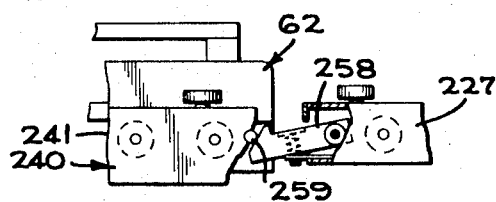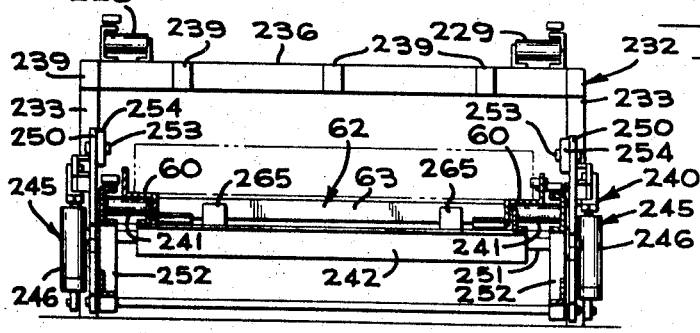

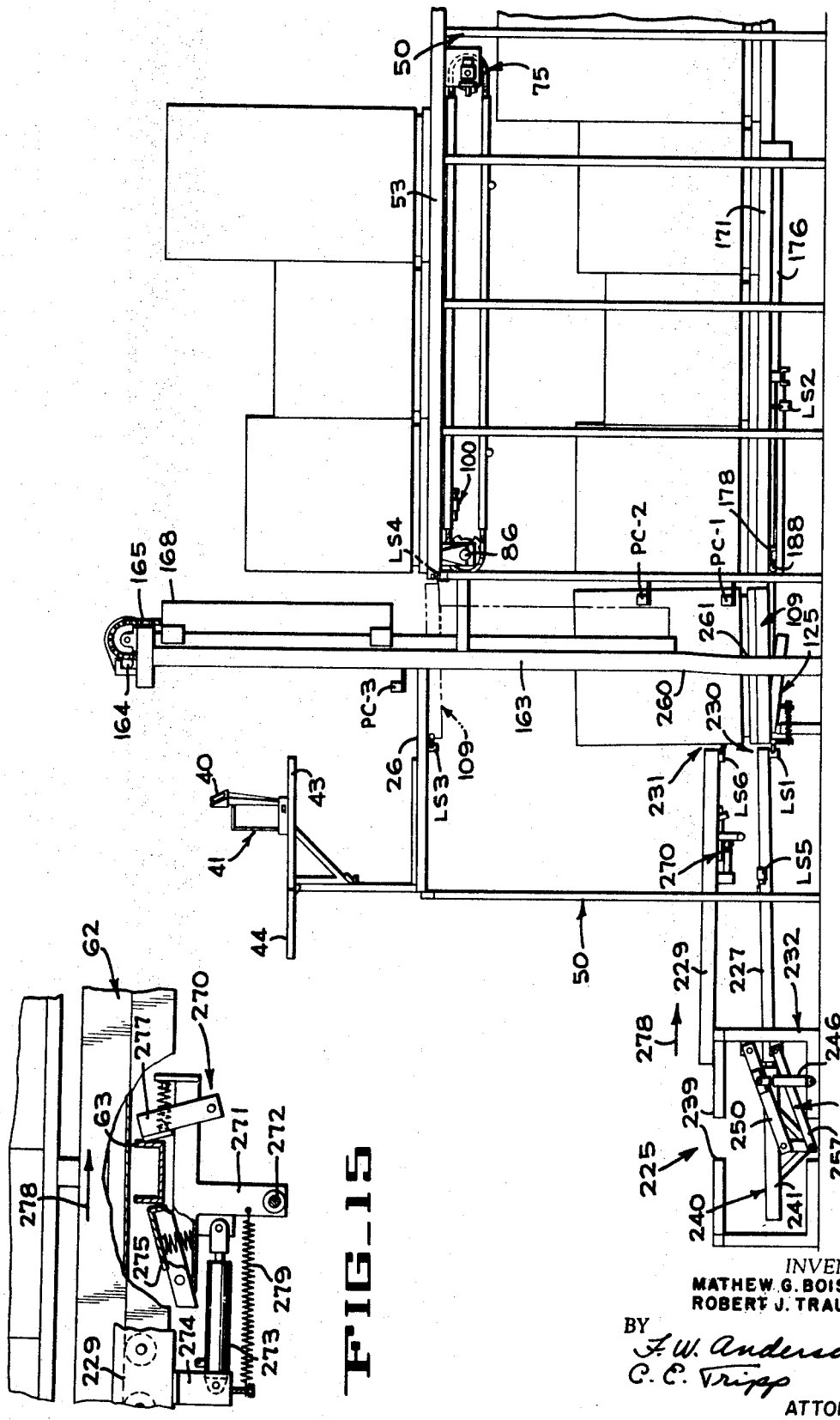

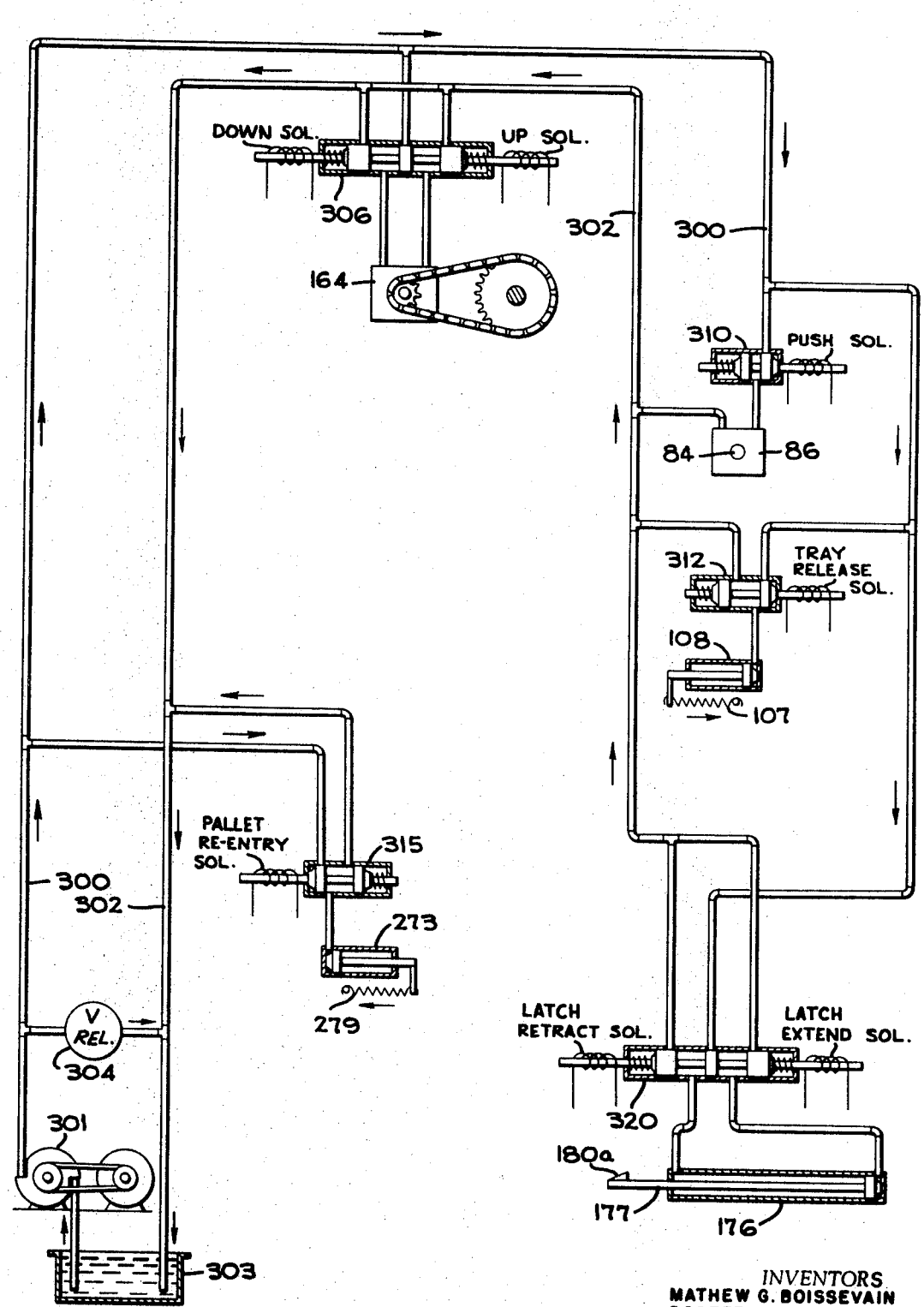

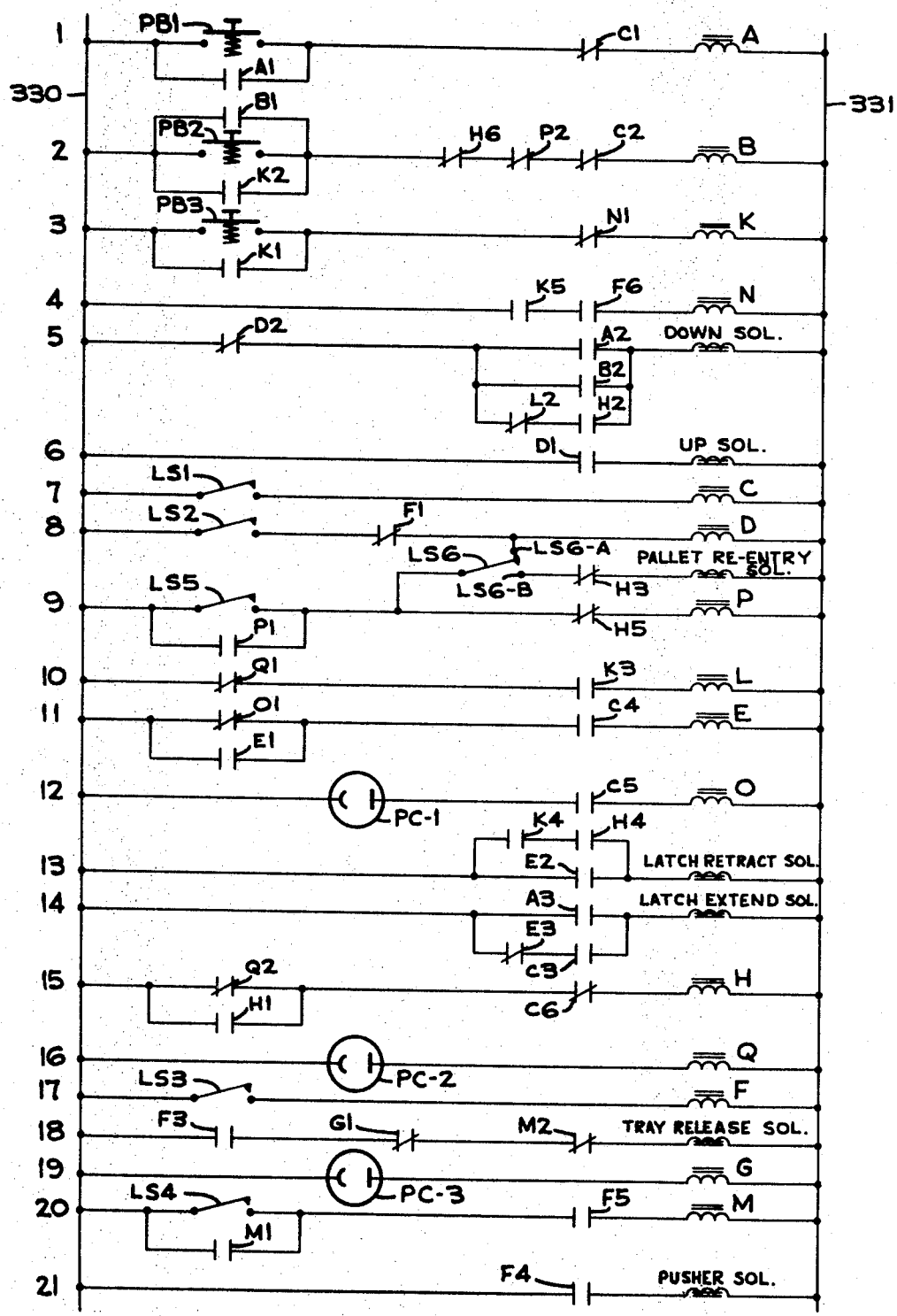
FIG_17

3,581,921

METHOD OF PROCESSING ARTICLES ON AN ENDLESS CONVEYOR IN A WAREHOUSE

This application is a continuation of Ser. No. 810,423 filed Jan. 2, 1969, now abandoned, which in turn was a division of Ser. No. 697,381 filed Jan. 21, 1968, now U.S. Pat. No. 3,458,062.

BACKGROUND OF THE INVENTION

This invention relates to a method of picking orders in a warehouse and apparatus for carrying out the method. At present the most universally used method of picking orders in warehouses involves an operator being supplied with a list of articles to be picked so that he can travel up and down in the aisles of the warehouse and remove the articles from the stationary bins or slots in which the articles are stored. It has also been proposed to provide a horizontally and vertically movable carrier on which the attendant can travel as he picks the articles. In accordance with the present invention, the articles are stored on pallets in a predetermined order and moved past the attendant so that he does not have to travel up and down the aisle. The use of moving storage units makes possible a more compact, floor-saving arrangement.

The U.S. Pats. to Egner No. 3,039,565, White et al. No. 1,819,491, Lanham et al. No. 3,062,352, and Schickedanz et al. No. 2,856,743 disclose article processing systems wherein the articles are moved on endless carriers.

SUMMARY OF THE INVENTION

The present invention provides a novel system and method for picking articles from storage means in a warehouse to fill orders, and apparatus for carrying out the method. In general, the present invention concerns the concept of providing endless conveyor means, on which articles are stored in a predetermined sequence so that they will arrive at an order-picking station in that sequence, and of providing means such as a prearranged tape, on which the category and the number of articles to be picked is given, for giving the attendant directions for picking the articles; the tape being so prepared that the attendant must process the trays in the sequence in which they are arranged on the endless carrier. Thus, the attendant automatically picks the order in the most efficient manner without wasted time and effort.

It is therefore an object of the invention to provide an efficient method of processing articles in a warehouse and an apparatus and system for carrying out the method.

Another object is to provide an effective means for replenishing pallets in a warehousing system.

Another object is to provide an improved conveying system for a warehouse.

Other and further objects, features and advantages of the present invention will be apparent to one skilled in the art from the following detailed description of a preferred embodiment, in which:

FIG. 1 is a diagrammatic plan view of a portion of the warehousing system of the present invention.

FIG. 2 is a fragmentary diagrammatic side elevation of the apparatus of FIG. 1.

FIG. 3 is a fragmentary diagrammatic perspective of a portion of a warehouse corresponding to a part of the apparatus of FIG. 1.

FIG. 4 is an enlarged diagrammatic perspective of the portion of the apparatus of FIG. 3 that is located at the order-picking station.

FIG. 5 is an enlarged fragmentary side elevation, with parts broken away and parts in section, of the portion of the system immediately adjacent an order-picking station, the view being taken looking in the direction of arrows 5–5 or FIG. 1.

FIG. 6 is a vertical section taken along lines 6–6 of FIG. 5.

FIG. 7 is a perspective of one of the trays used in the present system.

FIG. 8 is an enlarged fragmentary side elevation, with parts broken away and parts in section, of a lower transfer section of the system, the view being taken looking in the direction of arrows 8–8 of FIG. 3.

FIG. 9 is a fragmentary vertical section taken along lines 9–9 of FIG. 8.

FIG. 10 is an enlarged, fragmentary, side elevation of a load-replacement section of the system, the view being taken looking in the direction of arrows 10–10 of FIG. 3.

FIG. 11 is a top plan of the apparatus of FIG. 10, some parts being broken away and shown in section.

FIG. 12 is a vertical section taken on line 12–12 of FIG. 10.

FIG. 13 is an enlarged view, partly broken away, of a portion of FIG. 10.

FIG. 14 is a diagrammatic showing of one end of the warehousing system and particularly showing the location of the electric switches of the control system.

FIG. 15 is an enlarged view, partly broken away and in section, of a portion of FIG. 14.

FIG. 16 is a diagrammatic showing of the hydraulic control apparatus associated with one order-picking station of the system.

FIG. 17 is a diagram of the electric control system associated with one order-picking station of the system.

DESCRIPTION OF THE PREFERRED EMBODIMENT

In FIG. 1 the reference numeral 20 indicates a warehousing system that comprises four identical article storage lines 21, 22, 23 and 24. An attendant X (FIGS. 1 and 2) stands on an elevated platform 26 and services one end of the four lines while an attendant Y, standing on an elevated platform 27 services the other end of the lines. Since the four article-storage lines are identical, only line 21 will be described in detail.

In general, article storage line 21 comprises an upper conveying system 30 arranged to move pallets loaded with articles toward the left side to an order-picking station 31 in front of attendant X, and a lower conveyor system 32 arranged to move each loaded pallet toward the right side to a pickup position 34 below an order-picking station 33 to which each loaded pallet is elevated. Therefore the articles travel in a circuitous counterclockwise path as seen in FIG. 2.

The movements of the pallet loads are controlled by the attendants X and Y, each attendant receiving instructions as to which articles to pick from a screen 40 on which the information is projected. The screen 40 is part of a unit 41 which is of the type disclosed in the pending application of Stanley Weir, Ser. No. 530,057 which is assigned to the assignee of the present application, and which is incorporated by reference herein for a description of the unit. In general the unit 41 includes a housing 42 which encloses a drive mechanism that actuates a label-feeding mechanism on the housing and a presser foot which pushes each label onto an article as the article is carried by a power driven conveyor 43 past the unit 41. The labels are temporarily secured in single file on a backing strip, and indicia is provided on each label that indicates the type of article on which the label is to be applied, the number of that type of articles that is to be picked, and the destination of the article. A projection system associated with the housing 42 projects the indicia of each label onto the screen 40 for viewing by the attendant. The arrangement is such that, while one label is being applied to an article, the indicia on the next label is projected onto the screen. The tape of labels is prepared in advance by a computer-controlled system so that they are arranged on the tape in an efficient order-picking sequence. For example, on the upper conveying system 30 the pallet loads are arranged in a sequence of loads A, B, C, D, etc. The tape will be prepared so that the attendant X is directed to first pick the number of articles from load A that is necessary to fill the orders of a plurality of outlets, such as for 10 different retail stores. Each label projected on the screen indicates the article category or type and the number of articles of that type that remain to be picked. As the picking of articles from load A proceeds, a label is finally reached which indicates that no more articles of that category are to be picked. The attendant X is thereby alerted to the fact that the next label projected onto the screen will tell him what category of article must be picked next to fill the 10-store order. Of course, if articles from load B are needed, they will be scheduled after the articles from load A, while articles from load C will follow articles from load B, and so forth. Thus the tape is prearranged so that the pallet loads can be moved in a counterclockwise direction only. The tape supplied to attendant Y also schedules the articles so that he can pick an order for a plurality of stores in a manner such that he picks all of the items of load L that are desired, then all the articles of load M that are needed, then articles from load N, and so forth.

After each article receives a label it is delivered by conveyor 43 to a second conveyor 44 which is part of a system that delivers the articles to a sorting area, as for example a loading dock at which trucks are loaded for transporting the articles to each retail store. The indicia on the label that indicates the destination of the associated article may be machine-readable indicia and a system may be provided at the sorting area for reading each label and diverting each article to a particular truck in accordance with the indicia. Such a system is disclosed in the above-mentioned Weir application Ser. No. 530,057 and it is to be understood that each of the conveyors 44 can be operatively connected into such a conveying and sorting system.

The upper and lower conveying systems and the associated mechanisms are carried on a frame structure 50 which includes rigid steel horizontal and vertical channels and the like welded and bolted together to form a rigid structure.

The upper conveying system 30 includes a pair of spaced, inwardly opening channels 52 and 53 (FIG. 6) that are mounted in fixed, parallel, horizontal position on a plurality of transverse box beams 50B (one only being shown) that are secured between each pair of opposed vertical members 50A of the frame 50. Each of the inwardly opening channels 52 and 53 cooperates with an angle bar 54 to rotatably support a plurality of rollers 55. Thus, as best seen in FIG. 6, a line of rollers 55 is mounted on each side of the upper portion of frame 50, and the laterally spaced lines of rollers provide support surfaces for laterally spaced side bars 60 of a specially designed rigid metal tray 62. Each loaded tray is carried on one of these trays 62 which, as seen in FIG. 7, is made up of the two spaced bars 60 rigidly interconnected by an upwardly opening channel beam 63. Each of the bars 60 has a horizontal member 60a (FIG. 6) resting on the rollers 55, a vertical member 60b disposed for guided cooperation with rollers 66 rotatably mounted on the adjacent side channel 52 or 53, and a depending member 60c to which the transverse beam 63 is secured and to which a V-shaped abutment plate 68 is welded. The V-shaped plates 68 are also welded to the underside of the transverse beam 63. As seen in FIG. 6, the loaded pallet rests on the upper surfaces of the horizontal members 60a of the spaced side bars 60 of the tray.

At the end of the upper conveying system adjacent the picking station 31, a load-pushing mechanism 75 (FIG. 5) is mounted below the path of movement of the trays. This mechanism includes two spaced endless chains 76 and 77 each of which is trained around an idler sprocket 79 which is keyed to a shaft 80 that is rotatably journaled at each end in a bearing assembly 81 (one only being shown) supported from one of the channels 52 and 53. Each chain is also trained around a drive sprocket 83 which is keyed to a shaft 84 that is journaled in fixed bearings (not shown) and has one end connected in driven engagement to the drive element of a hydraulic motor 86. Each chain carries a plurality of pusher roller units 87 along its length, a unit 87 on one chain being directly opposite a unit 87 on the other chain so that the two chains act in unison. Each roller unit is made up of a special link 89 of the chain, a transverse pin 90 carried by the link 89, a pair of inner rollers 91 rotatable on pin 90, and a pair of outer rollers 92 rotatable on pin 90. The upper runs of the chains are supported by the rolling engagement of the pairs of outer rollers 92 on rigid tracks 93 and 94 that are supported by the transverse box beam 50B. The lower runs of the chains are supported by the sliding engagement of the links of the chain on guide bars 96 which are also supported from beam 50B.

A latch unit 100 (FIG. 5) is mounted on a transverse angle bar 101 that extends under the guide bars 93 and 94 to which it is welded. The latch unit includes a fixed bracket 103, and a lever 104 that is pivoted on the bracket, and has a notch 105 in one end for engagement with the leading, lower corner of the transverse channel 63 of each tray. The lever 104 is urged counterclockwise into tray intercepting position by a coil spring 107 connected between lever and the fixed angle bar 101. The lever is swung clockwise out of latching engagement with a tray by a single-acting hydraulic power cylinder 108 that is also connected between the lever and the angle bar 101. In unenergized condition, the plunger of the power cylinder limits the counterclockwise movement of the lever 104 under the urging of spring 107 to the tray-intercepting position of FIG. 5.

During the time when the elevator is at the order-picking station, the pusher chains 76 and 77 are continuously driven in unison by the hydraulic motor 86. If, as shown in FIG. 5, the leading tray is stopped by the latch unit 100, the inner rollers 91 of each pusher unit engage the V-shaped plates 68 of the tray, lift the tray slightly, and ride under the tray. If the latch has been retracted from latching engagement with the tray, the engagement of the pusher rollers 91 with the V-shaped plates 68 of the tray will cause the tray to be moved along to the left (FIG. 5) on the rollers 55.

When a loaded tray is disengaged by latch unit 100, it moves onto a platform 109 of an elevator 110. In FIG. 5 only a fragment of the platform 109 is shown, and reference is made to FIGS. 8 and 9 wherein the platform is shown in more details, it being noted however, that, in FIG. 8, the platform is in a lowered position. The platform 109 comprises two inwardly opening channels 112 and 113 that are disposed in parallel relation and secured together by a transverse angle bar 114 and a transverse cylindrical rod 115 that has a flat plate 116 at each end. As seen in FIG. 9, each of the channels 112 and 113 cooperates with an angle bar 117 to rotatably support a line of rollers 120. Also, a line of guide rotatable rollers 121 are mounted on the upper surface of each of the channels 112 and 113. Two identical latching mechanisms 125 (one only being shown) are mounted on the transverse rod 115 at a point between the channels 112 and 113, one latch being adjacent each of the channels. Each latching mechanism 125 includes a sleeve 127 (FIG. 9) that is rotatable on rod 115 and has an arm 128 welded to and extending downwardly therefrom. The sleeve 127 is urged in a counterclockwise direction FIG. 8 by a spring 130 that is disposed on a bolt 131 between the depending arm 128 of the sleeve and rigid strap 132 depending from the angle bar 114. A nut 134 on one end of the bolt and the head of the bolt act as stops that limit the counterclockwise rotation of the sleeve 127. A latching bracket 140 is also welded to the sleeve and projects away from the sleeve so that a pawl 141 and a stop 142 are disposed on opposite sides of the transverse centerline of the platform. The bracket has an I-shape in transverse section and includes a center web 144 (FIG. 8), a top wall 154, and a bottom wall 146. The pawl 141 and the stop 142 are identical in construction but oppositely disposed, and each of these members includes an upright plate 148 whose lower edge is in sliding engagement with the bottom wall 146 of the bracket. A cam plate 149, that has an inclined upper edge, is secured to the upright plate 148. A bolt 150, which extends through the plate 148 and through a plate 152, that is welded in the bracket between the web and the upper and lower walls thereof, guides the plate 148 for sliding movement longitudinally of the bracket. A coil spring 155 urges each plate 148 against a nut 156 which acts as a stop.

When no loaded tray is on the platform 109, the spring 130 raises the bracket 140 and the latching mechanism thereon to a substantially horizontal position. Then as a loaded tray moves onto the platform from the right side as from the upper conveying system, the channel 63 of the tray will first engage the cam 149 of pawl 141 and will swing the bracket 140 downwardly against the resistance of spring 130. As soon as the channel 63 clears cam 149, the spring 130 will swing the bracket upwardly to latch the channel between the pawl 141 and the spring-loaded stop 142 which acts as a cushioned stop to arrest the movement of the tray. If a loaded tray enters the platform from the left side, its channel 63 engages the stop 142 to swing the bracket down and then engages the pawl 141 which acts as a cushioning member to arrest the movement of the tray.

The vertical movement of the platform is guided by rollers 160 (FIG. 8) that are rotatably carried by box beams 162 one of which is secured, as by welding, to the outer side of each of the side channels 112 and 113 of the platform. There are two rollers 160 on each beam 162 and each pair of rollers rides in a track formed by a vertically mounted, inwardly opening channel 163 which is suitably secured to the frame 50. The platform is raised and lowered under control of a hydraulic orbit motor (FIG. 3) that actuates two chains 165, one end of each chain being bolted to the top end of each box beam 162. The other end of each chain is secured to a counterweight 168 (FIG. 14).

The lower conveying system 32 includes spaced lines 170 and 171 (FIG. 3) of rollers 172 that are identical in construction to the spaced lines of rollers 55 of the upper conveying system. The entrance end of the lower conveying system is shown in FIG. 8 and, it will be noted that a hook mechanism 175 is provided at this end to pull trays into the system. This hook mechanism includes a 3-inch double-acting hydraulic power cylinder 176 which has a 48-inch stroke and an end portion 178a pivotally connected by pin 170 to a pull rod 180. At its free end the pull rod 180 has a hook formed by a plate 180a that has an inclined upper surface and, at its pivot end, the pull rod has a depending arm 180b. A spring 183, disposed over a bolt 184 between the arm 180b and a plate 185 depending from bracket 178, urges the pull rod in a clockwise direction around pivot pin 179, and the head of the bolt and nuts 186 secured on the bolt determine the normal position of the hook end of the pull rod. A roller 188 on the end portion 178a of bracket 178 rides along a fixed track 189 to maintain the rod extension 177 in generally horizontal position.

It will be evident that, if the elevator platform 109 is in the lowered position of FIG. 8 with a loaded tray thereon, and the power cylinder is actuated to move the hook toward the left, the inclined upper surface of the hook will engage the channel 63 and will cause the pull rod to pivot about pin 179. However, as soon as the hook passes the channel 63, the pull rod will be swung upwardly by spring 183. Then when the cylinder 176 is energized to retract the pull rod, the hook will engage the channel 63 and pull the loaded tray from the elevator platform and move it onto the rollers of the lower conveying system.

Referring to FIG. 2, it will be noted that, at the extreme right end of the lower conveying system, an endless chain pusher mechanism 200 underlies the path of movement of the loaded trays. This pusher mechanism is identical to the pusher mechanism 75 (FIG. 5) that underlies the discharge end of the upper conveying system except that the rollers of pusher mechanism 200 move in a clockwise orbit so that they move from left to right when they are in the upper run of their endless path and are effective to move trays toward the pickup position 34. Also, a latch mechanism 201, that is identical to the latch mechanism 100 (FIG. 5), is mounted at the discharge end of the lower conveying system to control the entry of the trays into the pickup station.

A hook mechanism 210, that is identical to the hook mechanism 175 (FIG. 8) but is oppositely disposed, is mounted at the entrance end of the upper conveying system. The hook 211 of the mechanism 210 is adapted to be moved to the right to hook under the center channel 63 of a tray at the order-picking station 33 and pull it to the left onto the lines of rollers 55.

In the operation of the present warehousing system the actuation of the hook mechanism 210 is under the control of operator Y. When he has finished removing articles from a particular tray with its remaining articles is ready to be moved into the system, the operator activates the hook mechanism 210 which draws the tray onto the upper lines of rollers 55. The tray engages the preceding tray on the rollers and pushes it to the left, advancing the whole line of trays to the left. As seen in FIG. 2, it is desirable that the line of loaded trays in the upper conveying system is not continuous and that at least one space, as the space between loads D and E, be present. This empty space or spaces, in cooperation with the pusher mechanism 75, makes it possible for the operators to work at different speeds. It will be noted in the schematic showing of FIG. 2 that the next two actuations of the hook mechanism 210 will force load E into the operating range of pusher mechanism 75 so that the short line that supplies operator X will be replenished.

Similarly, the actuation of hook mechanism 175 under control of operator X moves loaded trays to the right along the rollers of the lower conveying system to replenish the short line of trays that overlies the pusher mechanism 200.

During normal operation it will sometimes happen that the operator is called upon to pick more articles from a tray than remains on the tray. Under these circumstances, the empty tray must be removed from the system and a full tray replaced in the same place in the system. The load replacement mechanism 225 associated with the left end of the system is shown in FIG. 3. This mechanism includes a pair of spaced lower lines 226 and 227 supported intermediate their lengths by vertical frame members. These lines of rollers are of the same construction as those in the upper and lower conveying systems. Referring to FIG. 8, it will be noted that the lower lines 226 and 227 are at the level of the platform 109 when the lowering movement of the platform is stopped at the tray discharge station 230 at the time two fixed bumpers or abutments 233 engage the latching mechanism 125 to release the tray. The upper lines 228 and 229 of rollers are disposed at a slightly higher elevation at a load reentering station 231.

The lower conveyor lines are inclined downwardly toward the left as seen in FIG. 10 and project into a framework 232 which is made up of two rigid sections and includes spaced vertical members 233 (FIG. 11), a pair of upper spaced horizontal members 235 and 236 and five horizontal pallet-support members 239 projecting inwardly from each of the members 235 and 236. A pallet lift mechanism 240 is disposed inside the frame and includes two lines 241 of rollers that are connected together by transverse angle bars 242 and 243, each line being disposed in alignment with one of the lower lines 226 and 227, and a lift unit 245 connected to each of the lines 241. Each lift unit comprises a power cylinder 246 that is pivotally anchored at 247 in the framework 232 and pivotally connected at 249 to a lift lever 250. Each lever 250 is pivotally connected by a transverse rod 251 to a rigid arm 252, secured to and projecting downwardly from one of the roller lines 241, and at 253 to a rigid bracket 254 connected to one of the vertical frame members 233. A link 257 is also pivotally connected between the arm 252 and a bracket 255 and is parallel to lever 250 to form a parallelogram linkage that maintains the generally horizontal attitude of the surface defined by the conveyor lines 241.

To prevent the entry of a tray into the framework 232 while the lift mechanism is elevated, a spring-loaded stop member 258 (FIG. 13) is pivotally mounted on the end of conveyor line 227. When the lift mechanism is in lowered position, a pin 259 on one conveyor line 241 holds the stop 258 down. As the lift mechanism is raised, the lever is pivoted to tray-intercepting position. It will be noted in FIGS. 3 and 8, that the side channels 163 of the frame that guide the vertical movement of the platform 109 are bent at points indicated generally by numerals 260 and 261. The bends are so arranged that at the load reentering station 231 the platform is inclined downwardly and to the right at about 1° to the horizontal while at the tray discharge station the platform is inclined 1° downwardly to the left. Accordingly, when a tray with an empty pallet reaches the lower tray discharge station 230, it rolls to the left onto roller lines 226 and 227 and is carried into the framework 232 where the center channel 63 of the tray engages two fixed stop plates 265 which, as shown in FIG. 12, project upwardly from the transverse angle bar 242 which extends between the lines 241 and 242. The tray will remain in this position until a fork lift operator places a loaded pallet on the pallet support members 239 of the framework 232, manually removes the empty pallet from the tray on the lift mechanism, and actuates an appropriate control to simultaneously energize the two power cylinders 246. When the cylinders are energized, the lift mechanism moves to the phantom line position of FIG. 10, causing the tray to engage the bottom of the loaded pallet and raise it from the members 239. When the lines 241 and 242 stop in the phantom line position of FIG. 10, they are inclined downwardly to the right and, accordingly, the tray carrying the loaded pallet moves toward the right by gravity onto the upper roller lines 228 and 229. As the tray moves down the lines 228 and 229, its center channel 63 engages two identical stop mechanisms 270, one only being shown in FIG. 14, one of which is disposed adjacent to and inwardly of each roller line 228 and 229. Each stop mechanism 270 comprises a T-shaped bracket 271 (FIG. 15) that is pivoted on a transverse rod 272, a single-acting power cylinder 273 pivotally connected between a fixed arm 274 and the bracket 271, a spring-loaded latch 275 mounted on one end of the bracket, and a spring-loaded cushioning member 277 mounted on the opposite end of the bracket. The center channel 63 of the tray, moving in the direction of arrow 278, engages and depresses the latch 275 which springs up behind the channel. The channel then hits the cushioning member 277, and the compression spring in this member yieldable resists the movement of the channel to bring the tray to a stop. As will be explained more fully hereinafter, the loaded tray remains in this position adjacent the reentry station 231 until a control operation is begun which energizes the power cylinder 273. Energization of the cylinder causes the bracket 271 to be swung clockwise about rod 272 causing the cushioning member 277 to be withdrawn from the path of the tray and causing the latch 275 to engage the tray cross channel 63 and give it a push to start it down the inclined rollers into the reentry station 231 where it will be received by the platform 109 of the elevator. Spring 279 then returns the stop mechanism to its tray stopping position.

ELECTRICAL CONTROL SWITCHES

In FIG. 14, the physical location of the electrical switches in the machine is diagrammatically shown.

Switch LS-1 is mounted on the conveyor line 227 so that its actuator is disposed in the path of downward movement of the elevator platform 109. The arrangement is such that the contacts of LS-1 are closed by the platform 109 but are automatically opened when the platform is moved upwardly.

Switch LS-2 is mounted adjacent the piston rod extension 177 of power cylinder 176 and is arranged to be actuated by the roller 188 mounted on the bracket 178 when the bracket is in the retracted position it reaches when a tray has been completely removed from the elevator platform. The bracket closes the contacts of switch LS-2, and they automatically open when the roller is subsequently projected forwardly by power cylinder 176.

Switch LS-3 is positioned on the upper part of the frame and has an actuator arranged to be engaged by the platform 109 of the elevator when the elevator is in its upper position at the order picking station. The platform will close the contacts of switch LS-3 and they will remain closed until the platform is lowered, at which time the contacts will automatically open.

Switch LS-4 is positioned adjacent the entry to the order picking station of attendant X to be actuated by a loaded pallet as it moves into the station. The switch has an actuator arranged to be engaged by one of the side bars of the tray of the entering pallet load. The tray closes the contacts of switch LS-4 which automatically open when the tray moves out of engagement with the switch.

Switch LS-5 is mounted adjacent the conveyor line 227 and has an actuator arranged to be contacted by a tray carrying an empty pallet away from the elevator. One side bar of the tray closes the contacts of switch LS-5 which automatically open when the tray passes out of engagement with the switch.

Switch LS-6 is mounted adjacent the end of roller conveyor line 229 and has an actuator arranged to be engaged by the platform 109 of the elevator. The switch is of the type wherein its actuator is engaged by the platform during both the upward and the downward movement of the platform, but the actuator is effective to close the switch contacts only when it is engaged by the platform during upward movement.

Photocell PC-1 is mounted at the lower end of the elevator shaft in a position such that its beam will be broken by an article on the rear portion of a pallet which has been lowered.

Photocell PC-2 is mounted a short distance above PC-1 and is arranged to be broken by the leading group of articles on a pallet load that is moved onto the elevator platform 109 at the reentry station 231.

Photocell PC-3 is positioned adjacent the order-picking station and has a beam arranged to be broken by a stack of articles entering the order-picking station.

A control console (not shown) is mounted at the order-picking station so that the operator can initiate any one of several cycles, which will be explained presently. For this purpose, the console will contain at least three pushbutton switches identified hereinafter as PB1, PB2, and PB3.

HYDRAULIC CONTROL APPARATUS

FIG. 16 is a diagrammatic showing of a typical hydraulic control system arranged for carrying predetermined cycles of the system under the control of attendant X.

Fluid under pressure is supplied to conduit 300 from a pump 301 and returned through a conduit 302 to a reservoir 303, a pressure relief valve 304 being connected in a conduit between conduits 300 and 302. Fluid from supply line 300 is directed to a valve 306 that controls the raising and lowering of the elevator by driving the reversible elevator motor 165. The arrangement is such that, when the solenoid, identified as UP SOL., is energized the spool of the valve is shifted to the left causing fluid to be directed into the motor to rotate the motor shaft in a direction to raise the elevator. When the solenoid, marked DOWN SOL. is energized the motor is rotated in a direction to lower the elevator. The motor may be of the type marketed by the Char-Lynn Company of Minneapolis, Minn. under the trademark Orbit and described in reissue patent Re. 25291.

Pressurized fluid from supply conduit 300 is also directed to a valve 310 that controls the flow of fluid to the hydraulic motor 86 that drives the pusher conveyor 75 for urging loaded pallets into the order-picking When a solenoid, identified as PUSHER SOL., is energized, fluid is directed into motor 86 to cause it to rotate in a direction to move the pusher rollers in the upper run of conveyor 75 toward the order-picking station.

A valve 312 controls the flow of fluid to the power cylinder 108 which is effective to swing the lever 104 in a direction to release a tray and allow it to be pushed into the order-picking station. When a solenoid, identified as TRAY RELEASE SOL. is energized, the valve spool is shifted in a direction to permit fluid to directed into the power cylinder 108 to swing the lever out of stopping-engagement with a tray.

Fluid from supply line 300 is also directed into a valve 315 that controls the stop mechanism 270 adjacent the pallet reentry station 231. When the solenoid, marked PALLET REENTRY SOL., is energized the valve spool will be shifted in a direction to cause fluid to enter power cylinder, forcing the piston rod outwardly to release the stop mechanism and urge the loaded pallet into the reentry station.

A valve 320 controls flow of fluid to the double-acting power cylinder 176 which is effective to alternately project the latch 180a to a position underlying the platform of the elevator or to withdraw the latch and pull a pallet into the lower conveying system. When the solenoid marked LATCH EXTEND SOL. is energized, fluid is directed to one end of power cylinder 176 to cause the piston to move toward the left to project the latch 180a to a position underlying the elevator. When the LATCH RETRACT SOL. is energized, the valve is shifted to cause the power cylinder to retract the latch and pull a tray into the lower conveying system.

CONTROL OPERATIONS

Part 1—Cycle A Situation—Attendant has picked the desired number of articles from one pallet, leaving one or more articles on the pallet. Under these conditions, the attendant wants to advance a new pallet to the picking station while advancing the first pallet away from the picking station but still keep it in the system.

To initiate this cycle, attendant X pushes button PB1 which is shown in line 1 of the circuit diagram of FIG. 17. When PB1 is depressed, a circuit is closed between electric power conductors 330 and 331. Relay A is energized to close contact A1 in line 1, contact A2 in line 5, and contact A3 in line 14. The closing of A1 establishes a holding circuit for relay A. When A2 closes, DOWN SOL. is energized, and the elevator begins to lower, opening switch LS3 in line 17 and deenergizing relay F. The closing of A3 in line 14 energizes LATCH EXTEND SOL., causing the latch 180a to be projected to a position underlying the descending elevator. When the elevator reaches its lowered position, it contacts and closes LS1 in line 7 to energize relay C. Contact C1 in line 1 opens to deenergize relay A, opening contact A2 in line 5 to deenergize DOWN SOL. and stop the downward movement of the elevator, and opening contact A3 in line 14 to deenergize LATCH EXTEND SOL. Relay contacts C4 in line 11 and C5 in line 12 are closed to partially complete circuits to relays E and O respectively. As the elevator reaches its lowered position, the two posts 233 pivot the latching mechanisms to release the tray on the elevator. Since there are articles remaining on the rear of the pallet on the elevator, the beam to photocell PC-1 in line 12 will be interrupted, preventing the energization of relay O. Relay E in line 11 will be energized through contact O1 and C4, causing the closing of holding contact E1 in line 11 and E2 in line 13. The closing of E2 energizes the LATCH RETRACT SOL., causing the latch 180a to pull the tray and the pallet thereon onto the lower conveying system, and moving the pallet loads already in this system toward the left. When the tray has been pulled onto the roller lines of the lower conveyor system, the roller 188 engages switch LS2 in line 8 and closes it to energize relay D.

Part 2—Cycle A Contact D2 in line 5 opens to keep DOWN SOL. deenergized, and contact D1 in line 6 closes to energize UP SOL. and start the upward movement of the elevator. As the elevator starts up, it releases LS1 in line 7 to deenergize relay C. Contact C4 in line 11 opens to deenergize relay E, and contact E2 in line 13 opens to deenergize LATCH RETRACT SOL.

As the elevator reaches its upper position, the platform of the elevator actuates LS3 in line 17 thereby energizing relay F. Contact F1 in line 8 opens to deenergize relay D, opening contact D1 in line 6 and deenergizing UP SOL. to stop the upward movement of the elevator. Contact F3 in line 18 closes to energize TRAY RELEASE SOL. causing the stop lever to be withdrawn from in front of the loaded tray at the entrance to the stock-picking station. The closing of contact F4 in line 21 energizes PUSHER SOL. which starts the movement of the pusher conveyor for urging the loaded tray into the order-picking station in front of attendant X. The entering tray engages and closes switch LS4 in line 20 to energize relay M. Contact M1 in line 20 forms a holding circuit, and contact M2 in line 18 opens to deenergize TRAY RELEASE SOL., permitting the stop lever 104 to be spring-urged to tray-intercepting position.

Cycle B Situation—Attendant X finishes picking the desired number of articles from a tray and, in so doing, he empties the tray. Under these circumstances he desires to move a new tray load to the order-picking station while the empty pallet is replaced by a full pallet having the same type of articles as those removed from the empty pallet. Thus the new full pallet must be put into the system in the position in the sequence of pallet loads formerly occupied by the empty pallet so that the sequence will not be changed.

It will be understood that the parties who prepare the tape for attendant X know the sequence of trays and the number of articles to be removed from each tray. Accordingly they can print out a list of the sequence in which attendant X will empty pallets. When provided with this list, a forklift operator can observe the reentry station 231 of storage line 21 at which attendant X is working and, as soon as one pallet load is put into the system at this station, he can consult the list, locate a pallet load of the desired type, place it on the support arms 239 of framework 232, and actuate the lift mechanism in the framework to place a tray under the new pallet load and cause it to be moved to a latched position adjacent the reentry station to await the time when attendant X initiates Cycle B.

To start cycle B, attendant X depresses button PB2 in line 2 to energize relay B, contact B-1 in line 2 closing to form a holding circuit. Contact B2 in line 5 closes to energize DOWN SOL. causing the elevator to start downwardly, opening switch LS3 in line 17, deenergizing relay F, and opening F5 in line 20 to deenergize relay M. When the elevator reaches its lower position, it contacts and closes LS1 in line 7 to energize relay C. Contact C2 in line 2 opens to deenergize relay B and open contact B2 in line 5 to deenergize DOWN SOL. and stop the lowering of the elevator. Contact C3 in line 14 is closed to energize LATCH EXTEND SOL. causing the power cylinder 176 to project the latch 180a toward the elevator. At this time, the tray is loose on the elevator platform since the posts 233 have pivoted the latch mechanism 125 to tray release position. Accordingly, the advancing latch 180a engages the tray and pushes it down the slightly inclined platform onto the conveyor lines 226 and 227. Contact C5 in line 12 is closed to energize relay O, and open contact O1 in line 11 to keep the relay E deenergized. The tray with the empty pallet closes switch LS5 in line 9 to energize relay P, contact P1 forming a holding circuit. The closing of LS5 also energizes relay D through normally closed contact LS6-A and P1. Contact D1 in line 6 closes to energize UP SOL. and start the elevator upward, causing the elevator platform to engage switch LS6, opening the normally closed contacts LS6-A to deenergize relay D, open contact D1 in line 6 and deenergize the UP SOL., thereby stopping the elevator at the reentry station 231. When contacts LS6-A were opened, contacts LS6-B were closed to energize PALLET REENTRY SOL. to release the new pallet load that had been positioned adjacent the station by the forklift operator. When this solenoid is actuated the pallet is not only released but also given a push to urge it onto the platform 109 which is slightly inclined at this station. As the loaded pallet comes to rest in latched position on the elevator platform, the articles at the rear of the pallet load break the beam to photocell PC-2 in line 16, deenergizing relay Q to close the normally closed contact Q2 in line 5 and thus energize relay H. Contact H2 in line 5 closes, energizing DOWN SOL. to start the elevator downward once more. Contact H3 in line 9 opens to deenergize PALLET REENTRY SOL. Contact H5 in line 9 opens to deenergize relay P. As the elevator approaches its lowermost position, LS1 in line 7 is closed, energizing relay C and opens contact C6 in line 15 to deenergize relay H. Contact H2 in line 5 opens to deenergize DOWN SOL. and stop the descent of the elevator. Also, as the elevator reaches its lowermost position, the beam to photocell PC1 in line 12 is broken by the articles on the tray keeping relay O deenergized. The closing of contact C4 in line 11 energized relay E, causing contact E2 in line 13 to close and energize LATCH RETRACT SOL. which actuates power cylinder 176 to retract latch 180a and pull the loaded pallet and tray into the lower conveyor system. The roller 188 on the bracket 178 actuates switch LS2 in line 8 to deenergize relay D.

The rest of Cycle B concerns the raising of the elevator platform and the movement of a new loaded pallet and tray into the order-picking station. This operation is the same as Part 2 of Cycle A and the control operations are identical.

Cycle C Situation—Attendant X has removed all of the articles from the pallet before him at the order-picking station but he still needs more of the same category of article. Accordingly, he must lower the empty pallet, discharge it, raise the elevator to the reentry station to receive the pallet load waiting there, and raise it to the order-picking station.

This cycle is started by depressing the button of switch PB3 in line 3 to energize relay K. Contact K1 forms a holding circuit while contact K2 in line 2 closes to energize relay B. Contact B2 in line 5 closes to energize DOWN SOL. and start the descent of the elevator. In its lowermost position the platform 109 actuates switch LS1 in line 7 to energize relay C. Contact C5 in line 12 closes to energize relay O and open contact O1 in line 11, thereby preventing energization of the relay E. Contact C2 in line 2 opens to deenergize relay B and open contact B2 in line 5 to deenergize DOWN SOL. and stop the descent of the elevator. Contact C3 in line 14 is closed to energize LATCH EXTEND SOL. causing the power cylinder 176 to project the latch 180a toward the elevator. Since the stop mechanisms 125 have been moved out of engagement with the tray on the elevator, the advancing latch 180a engages the tray and starts it down the slightly inclined platform toward the lift mechanism in the framework 232. The tray closes switch LS5 in line 9, energizing relay P and closing contact P1 to form a holding circuit. Contact P2 in line 2 opens to prevent energization of relay B when contact C2 is subsequently closed, thereby assuring that DOWN SOL. will not be energized while the elevator opens LS1 to deenergize relay C. Relay D in line 8 is also energized, when LS5 is closed, through contacts LS6-A. Contact D1 in line 6 is closed to energize UP SOL. to start the elevator upward, opening LS1 and deenergizing relay C. At the reentry station, the upwardly moving platform actuates LS6 in line 9 to deenergize relay D, open contact D1 in line 6 and deenergize UP SOL. to stop the elevator. The closing of LS6 also energizes PALLET REENTRY SOL. to cause the new load to be moved onto the elevator platform at the reentry station. As the new pallet load comes to rest on the platform, the articles at the rear of the load breaks the beam to photocell PC2 in line 16, deenergizing relay Q. Contact Q1 in line 10 closes to energize relay L, and contact Q2 in line 15 closes to energize relay H. DOWN SOL. in line 5 is not energized because contact L2 is open. Contact H3 in line 9 opens to deenergize PALLET REENTRY SOL.; contact H5 in line 9 opens to deenergize relay P; contact H6 in line 2 opens to keep relay B deenergized; and contact H4 in line 13 closes to energize LATCH RETRACT SOL., through closed contact K4, causing power cylinder 176 to retract latch 180a. When the latch is retracted, switch LS2 in line 8 is closed to energize relay D. Contact D1 in line 6 is closed to energize UP SOL., starting the elevator upward. Contact D2 in line 5 opens to prevent energization of DOWN SOL. and, as the elevator moves up, switch LS1 is opened to deenergize relay C. Photocell PC-3 in line 19 is so positioned that as the elevator with a stack of articles comes up into the order-picking station, the articles interrupt the light beam to PC-3 just before the elevator platform closes LS3. When the beam to PC-3 is broken, relay G is deenergized, opening contact G1 in line 18. Accordingly, when LS3 is closed to energize relay F, TRAY RELEASE SOL. in line 18 will not be energized and no new load will be moved into the order-picking station during this cycle. Contact F1 in line 8 opens to deenergize relay D, opening contact D1 in line 6 and stopping the upward movement of the elevator. Contact F6 in line 4 opens to deenergize relay N, opening contact N1 in line 3 to deenergize relay K. The new load of articles is now at the order-picking station so that attendant X can finish picking the desired number of articles of that category.

As previously mentioned, the order-picking station 33 at which attendant Y is operating is provided with a set of actuating mechanisms that are substantially identical but oppositely disposed to those associated with order-picking station 31. The latch mechanism 210 (FIG. 2) is of the same construction as latch mechanism 175; the pusher conveyor 200 is identical to the pusher conveyor 75, but operates in the opposite direction; the tray release unit 201 is identical to tray release unit 100; an empty pallet removal and full pallet replacement unit 340 is identical to but oppositely disposed to the unit that includes the framework 232, the roller conveyor lines 227–229, the lift mechanism associated with the framework 232 and the stop mechanism 270. Similarly, the elevator, the labeling unit, and the conveying system associated with station 33 are substantially identical to those at station 31. Since the several mechanisms at station 33 have different orientations and directions of movement than those at station 31 the hydraulic control system and the electrical control system will vary somewhat from the systems shown in FIGS. 16 and 17. The necessary modifications will be evident to one skilled in the art, and further these modifications will be evident from the following description of the operations of the mechanisms as cycles A, B, and C are carried out by attendant Y at order-picking station 33.

Cycle A — Attendant Y has removed the desired number of articles from a pallet and desires a new pallet to be delivered while the partially empty pallet is advanced in the system. To start this cycle attendant Y presses a button on his control console. Latch mechanism 210 is activated, causing its power cylinder to project the latch to a position underlying the pallet on the elevator platform and on the far side of the central channel of the tray on which the pallet is carried. When the tray reaches this extended position a switch is tripped that causes the latch to be retracted, thus pulling the tray and the partially empty pallet thereon onto the rollers of the upper conveying system 30. This tray and pallet load engage the preceding load in the upper conveying system and move them and the loads in front of them toward the left toward the order-picking station 31. When the latch reaches the retracted position, a switch is actuated that causes the elevator to be lowered. When the elevator reaches its lowered position, the stop 201 is withdrawn from in front of the leading pallet load in the lower conveying system, and the pusher conveyor 200 is activated to move the leading load onto the elevator platform. The stop 201 is moved up again to load intercepting position, and the motor of the elevator is energized to raise the new load to the order-picking station 33.

Cycle B — Attendant Y removes the desired number of articles from a pallet and, in so doing, empties the pallet which must then be replaced by a full pallet of the same articles, without changing the sequence of the system. To start Cycle B, attendant Y presses the appropriate pushbutton which initiates a control operation to energize the elevator motor to lower the elevator platform. When the tray reaches its lowermost position, it is automatically unlatched and it moves by gravity down the inclined platform of the elevator toward the unit 330. As the tray moves toward unit 340, the elevator motor is energized to start the upward movement of the elevator. At the reentry station 231A, the elevator is stopped so that the elevator platform is in alignment with the upper conveyor roller lines of the unit 340 on which t' ɔ forklift operator has placed the replacement pallet load. When the platform reaches the reentry station, the stop mechanism is actuated to release the new load and push it dᴄwɴ the slightly inclined roller lines onto the slightly inclined platform. When the load is on the platform, the elevator motor is energized to raise the load to the order-picking station 33. When the load reaches this station, the latch mechanism 210 is actuated to project the latch to a position under the tray of the new load. Then the latch is retracted, pulling the load into the upper conveying system. As soon as the new load is in the upper conveying system, the elevator is lowered, the stop 210 is actuated, and the pusher conveyor 200 is activated to move the leading pallet load on the lower conveying system onto the elevator platform. The stop 201 is then moved up to load intercepting position, and the elevator motor is energized to raise the load to the order-picking station 33 for resumption by attendant Y of his ordernpicking activity.

Cycle C — Attendant empties a pallet and needs more items of the same category to finish picking his order. In this case, he wants to discard the empty pallet and have a full one moved to the order-picking station. To start Cycle C, the attendant pushes an appropriate button on his control console which initiates a control operation to energize the elevator motor to lower the elevator platform. When the platform reaches its lowest position, the tray is automatically unlatched and it moves by gravity down the inclined elevator platform onto the inclined roller lines and into the unit 340. As the tray moves along the roller lines, the elevator motor is energized to start the upward movement of the elevator. At the reentry station 231A, the elevator is stopped so that the elevator platform is in alignment with the upper conveyor roller lines on which the forklift operator has placed the replacement pallet load. When the platform reaches the reentry station, the stop mechanism is actuated to release the new load and push it down the slightly inclined roller lines onto the slightly inclined platform. When the load is on the platform, the elevator motor is energized to raise the load to the order-picking station 33. The attendant can then resume his picking operation.

While the system has been described in connection with the use of full size pallets, it is within the scope of the present invention to use half-size pallets, each half-size pallet carrying a different category of articles. In this case the tray 62 (FIG. 7) may be slightly modified by bringing the upper edges of the channel 63 up to a point where they are flush with the surfaces 60a and additional transverse members having surfaces flush with 60a can be secured between the side members 60c at the front and rear of the tray to provide a stable support for the two half pallets. The tape of labels would be prepared in the same manner as for full pallets, the attendant of course being aware of the fact that two different categories of articles that are in sequence on the tape are side-by-side in front of him.

In FIG. 2, an arrangement is shown wherein one space is provided between loads on the upper and lower conveyor systems, as between D and E in the upper system and between O and P in the lower system. This spacing can be varied depending upon the capabilities of the operators at each end of the system. For example, if loads E and F and loads P and Q were removed, the spacing would be increased and the necessity for the operators to work at substantially the same speed would be decreased. The concept of the provision of empty spaces is to make possible the independent operation of the operators.

Also, while FIG. 2 disclosed an endless carrier system moving in a counterclockwise direction, it will be understood that by a suitable rearrangement of the linkages it can be made to operate in a clockwise direction and carry out all the prescribed functions.

Also, while a system has been disclosed using a labelling machine in which a prearranged tape is used, it is within the scope of the present invention to provide the operator with a computer-arranged pile of IBM cards or the like which has indicia thereon indicating the category of each article to be picked and the sequence of the cards would indicate the sequence of picking. The card could be applied to each article as by gluing or the like.

Having thus described the invention, what I claim as new and desire to be protected by Letters Patent is:

1. The method of processing articles in a warehouse comprising storing articles on pallets with each pallet having articles of only one category stored thereon, disposing the loaded pallets in a predetermined sequence on an endless carrier, having upper and lower generally horizontal levels, establishing an order-picking station adjacent the end points on the upper carrier level, preparing a plurality of identification members adapted to be affixed to articles removed from the pallets and assembling a quantity of members at each station with members associated with each article category being grouped together and the groups being arranged in the same sequence as the sequence of the pallets having those categories are arranged on the carrier, removing articles from a first pallet at one station and from a second pallet at the other station during the same time interval, affixing identification members to the selected articles, moving the first pallet away from said one station and toward the other station on the upper level, moving a third pallet into said one station while continuing to remove articles from said second pallet at said other station, and thereafter moving the second pallet from said other station toward said one station on the lower level.

2. The method of claim 1, comprising replenishing the carrier on its lower level from an end of the latter.

PO-1050
(5/69)

UNITED STATES PATENT OFFICE
CERTIFICATE OF CORRECTION

Patent No. 3,581,921          Dated  June 1, 1971

Inventor(s)  MATHEW G. BOISSEVAIN et al

It is certified that error appears in the above-identified patent and that said Letters Patent are hereby corrected as shown below:

Column 1, line 70,  change "or" to --of--.

Column 5, line 20,  after "motor" insert --164--.

Column 5, line 32,  change "170" to --179--.

Column 6, line 4,  after "tray" insert --and the tray--.

Column 8, line 57, after "picking" insert --station--.

Column 13, line 2, change "ordernpicking" to --order picking--.

Signed and sealed this 21st day of March 1972.

(SEAL)
Attest:

EDWARD M. FLETCHER, JR.          ROBERT GOTTSCHALK
Attesting Officer               Commissioner of Patents